(12) United States Patent
Petrou et al.

(10) Patent No.: US 9,137,308 B1
(45) Date of Patent: Sep. 15, 2015

(54) METHOD AND APPARATUS FOR ENABLING EVENT-BASED MEDIA DATA CAPTURE

(75) Inventors: David Petrou, Brooklyn, NY (US); Laura Garcia-Barrio, Brooklyn, NY (US); Hartmut Neven, Malibu, CA (US); Hartwig Adam, Marina Del Rey, CA (US)

(73) Assignee: Google Inc., Mountain View, CA (US)

( * ) Notice: Subject to any disclaimer, the term of this patent is extended or adjusted under 35 U.S.C. 154(b) by 449 days.

(21) Appl. No.: 13/346,529

(22) Filed: Jan. 9, 2012

(51) Int. Cl.
*G06F 15/16* (2006.01)
*H04L 29/08* (2006.01)
*G06F 17/30* (2006.01)

(52) U.S. Cl.
CPC ............... *H04L 67/12* (2013.01); *G06F 17/30* (2013.01)

(58) Field of Classification Search
CPC ... H04L 67/12; G06F 17/30; G06F 17/30017; G06F 17/30028; G06F 17/30047; G06F 17/30247
USPC .................................. 709/217; 348/135, 148
See application file for complete search history.

(56) References Cited

U.S. PATENT DOCUMENTS

| | | | |
|---|---|---|---|
| 6,377,793 B1 | 4/2002 | Jenkins | |
| 6,480,713 B2 | 11/2002 | Jenkins | |
| 6,681,107 B2 | 1/2004 | Jenkins et al. | |
| 6,690,516 B2 | 2/2004 | Aritake et al. | |
| 7,363,024 B2 | 4/2008 | Jenkins | |
| 8,179,434 B2 * | 5/2012 | Koval et al. | 348/92 |
| 8,332,424 B2 | 12/2012 | Flynn et al. | |
| 8,484,223 B2 * | 7/2013 | Ota | 707/748 |
| 8,649,776 B2 * | 2/2014 | Tofighbakhsh et al. | 455/414.1 |
| 2003/0020812 A1 * | 1/2003 | Gutta et al. | 348/148 |
| 2005/0083413 A1 | 4/2005 | Reed et al. | |
| 2005/0128072 A1 * | 6/2005 | Li | 340/538 |
| 2005/0162523 A1 | 7/2005 | Darrell et al. | |
| 2006/0264209 A1 | 11/2006 | Atkinson et al. | |
| 2007/0088488 A1 * | 4/2007 | Reeves et al. | 701/117 |
| 2007/0096909 A1 | 5/2007 | Lally | |
| 2007/0250901 A1 | 10/2007 | McIntire et al. | |
| 2008/0043108 A1 | 2/2008 | Jung et al. | |
| 2008/0140444 A1 * | 6/2008 | Karkanias et al. | 705/2 |
| 2008/0167004 A1 | 7/2008 | Jenkins | |
| 2008/0285940 A1 | 11/2008 | Kulas | |
| 2009/0003662 A1 | 1/2009 | Joseph et al. | |
| 2009/0006937 A1 | 1/2009 | Knapp et al. | |

(Continued)

OTHER PUBLICATIONS

U.S. Appl. No. 13/344,299, filed Jan. 5, 2012, Anguelov et al.

(Continued)

*Primary Examiner* — Duyen Doan
(74) *Attorney, Agent, or Firm* — Blakely Sokoloff Taylor & Zafman LLP

(57) ABSTRACT

A method and apparatus for enabling media data capture based on a real-world user experience is described herein. According to embodiments of the invention, media data is captured by a mobile computing device and transmitted to a server computer system in response to identifying one or more events from sensor data. The server computer system adds the captured media data, along with data identifying the event that initiated the capture of the media data, to a history of real-world experiences of a user of the mobile computing device. The server computer system may further perform one or more recognition processes on the captured media data and, when the one or more recognition processes find a match, associate the recognized items to the captured media data.

24 Claims, 10 Drawing Sheets

(56) References Cited

U.S. PATENT DOCUMENTS

| | | | |
|---|---|---|---|
| 2009/0049004 A1* | 2/2009 | Nurminen et al. | 707/1 |
| 2009/0089352 A1* | 4/2009 | Davis et al. | 709/201 |
| 2009/0094520 A1 | 4/2009 | Kulas | |
| 2009/0100050 A1 | 4/2009 | Erol et al. | |
| 2009/0102859 A1 | 4/2009 | Athsani et al. | |
| 2009/0165140 A1 | 6/2009 | Robinson et al. | |
| 2009/0182644 A1 | 7/2009 | Panagopulos et al. | |
| 2010/0046842 A1 | 2/2010 | Conwell | |
| 2010/0103075 A1 | 4/2010 | Kalaboukis et al. | |
| 2010/0318507 A1 | 12/2010 | Grant et al. | |
| 2011/0025842 A1* | 2/2011 | King et al. | 348/135 |
| 2011/0069179 A1* | 3/2011 | Bathiche et al. | 348/207.1 |
| 2011/0072015 A1 | 3/2011 | Lin et al. | |
| 2011/0135144 A1* | 6/2011 | Franklin et al. | 382/100 |
| 2011/0143811 A1 | 6/2011 | Rodriguez | |
| 2011/0145214 A1 | 6/2011 | Zhang et al. | |
| 2011/0212717 A1 | 9/2011 | Rhoads et al. | |
| 2011/0213664 A1 | 9/2011 | Osterhout et al. | |
| 2011/0255738 A1 | 10/2011 | Gao et al. | |
| 2011/0256886 A1 | 10/2011 | Velusamy | |
| 2012/0004036 A1* | 1/2012 | Hill | 463/42 |
| 2012/0045093 A1 | 2/2012 | Salminen et al. | |
| 2012/0159326 A1* | 6/2012 | Mital et al. | 715/716 |
| 2012/0233000 A1 | 9/2012 | Fisher et al. | |
| 2012/0320013 A1* | 12/2012 | Perez et al. | 345/207 |
| 2013/0036134 A1 | 2/2013 | Neven et al. | |
| 2013/0096731 A1* | 4/2013 | Tamari et al. | 701/1 |
| 2013/0169626 A1 | 7/2013 | Balan et al. | |
| 2014/0073291 A1 | 3/2014 | Hildner et al. | |

OTHER PUBLICATIONS

Nagao, Katashi, et al, "Ubiquitous Talker: Spoken Language Interaction with Real World Objects," Technical Report SCSL-TR-95-003, Sony Computer Science Laboratory Inc., Tokyo, Japan, 1995, 11 pages.

Rekimoto, Jun, "Augmented Interaction: The World Through the Computer," <http://ftp.csl.sony.co.jp/person/rekimoto/navi.html>, 1995, 2 pages.

Rekimoto, Jun, "Augmented Interaction: Toward a New Human-Computer Interaction Style Based on Situation Awareness," Interactive Systems and Software II (WISS'94 Proceedings), 1994 (in Japanese), 10 pages.

Rekimoto, Jun, "The Magnifying Glass Approach to Augmented Reality Systems," International Conference on Artificial Reality and Tele-Existence 1995 / Conference on Virtual Reality Software and Technology (ICAT/VRST 1995), 10 pages.

Rekimoto, Jun, et al, "The World through the Computer: Computer Augmented Interaction with Real World Environments," User Interface Software and Technology (UIST 1995), 8 pages.

Sung, Dan, "Augmented reality in action—social networking," <http://m.pocket-lint.com/news/news.phtml/38918>, Mar. 4, 2011, 7 pages.

Screen Capture of a YouTube Video, "N'importe Comment—The Toxic Avenger Feat Orelsan," <http://www.youtube.com/watch?v=XAOwo6uuhok>, accessed May 10, 2011, 1 page.

Wikipedia, "Lifelog," <http://en.wikipedia.org/wiki/lifelog>, Last Modified Apr. 3, 2011, 3 pages.

Girardin, Fabien, et al., "Uncovering the presence and movements of tourists from user-generated content," Oct. 17, 2008, 11 pages.

PCT/US2012/047537; PCT International Search Report and Written Opinion, mailed Dec. 26, 2012, 10 pages.

PCT/US2012/047537; PCT International Preliminary Report on Patentability, mailed Feb. 13, 2014, 8 pages.

Adam, H. et al. Enabling Real-World User Experiences to Be Shared Via a Social Network, U.S. Appl. No. 13/346,564, filed Jan. 9, 2012, whole document.

* cited by examiner

METHOD AND APPARATUS FOR ENABLING EVENT-BASED MEDIA DATA CAPTURE

TECHNICAL FIELD

Embodiments of the invention relate to the field of mobile computing devices, and more particularly, to enabling event-based media data capture.

BACKGROUND

A mobile computing device may include one or more of an image sensor (e.g., a camera) and/or an audio sensor (e.g., a microphone) to capture media data about people, places, and things a user of the mobile computing device encounters. Current solutions require a user to manually initiate the capture of media data. The drawback to these solutions is that a user must first decide to capture media data, and may miss capturing media data related to an "event" if the user is required to react to the event in order to initiate media data capture. Other solutions continually capture media for a certain time period in order to hopefully capture media data related to an event. The drawback to these solutions is that they may require an excessive amount of memory if the time period is large, and also require the user to manually review and segment the large amount of captured media data.

SUMMARY

A method and apparatus for enabling media data capture in response to detecting an event is described herein. According to embodiments of the invention, media data is captured by a mobile computing device and transmitted to a server computer system in response to identifying one or more events from sensor data. The server computer system adds the captured media data, along with data identifying the event that initiated the capture of the media data, to a history of real-world experiences of a user of the mobile computing device. The server computer system may further perform one or more recognition processes on the captured media data and, when the one or more recognition processes find a match, associate the recognized items to the captured media data.

These and other aspects and embodiments are described in detail in the drawings, the description, and the claims.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Embodiments of an apparatus, system and method for enabling media data capture based on one or more real-world user experiences are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
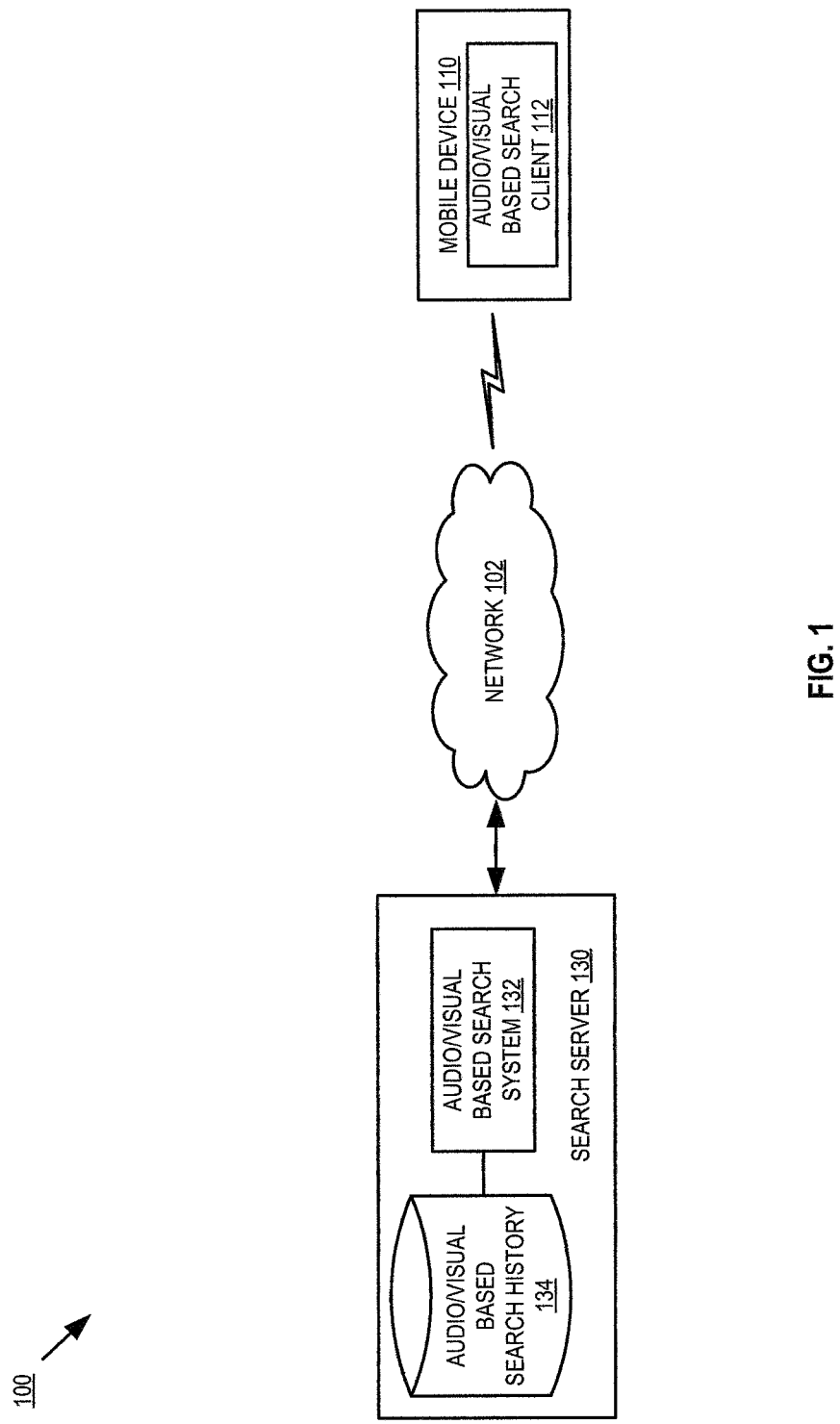
FIG. 1 is a block diagram of a system architecture including a client device having media data capture capabilities according to an embodiment of the invention.

FIG. 1 is a block diagram of a system architecture including a client device having media data capture capabilities according to an embodiment of the invention. System 100 includes mobile device 110 and search server 130. Mobile device 110 may be a mobile computing device, such as a mobile telephone, personal digital assistant, tablet computer, wearable computing device, etc. Search server 130 may also be a computing device, such as one or more server computers, desktop computers, etc.

Mobile device 110 and search server 130 may be communicatively coupled via network 102 using any of the standard network protocols for the exchange of information. In one embodiment, mobile device 110 is coupled with network 102 via a wireless connection, such as a cellular telephone connection, wireless fidelity connection, etc. Mobile device 110 and search server 130 may run on one Local Area Network (LAN) and may be incorporated into the same physical or logical system, or different physical or logical systems. Alternatively, mobile device 110 and search server 130 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

Figure 9A:
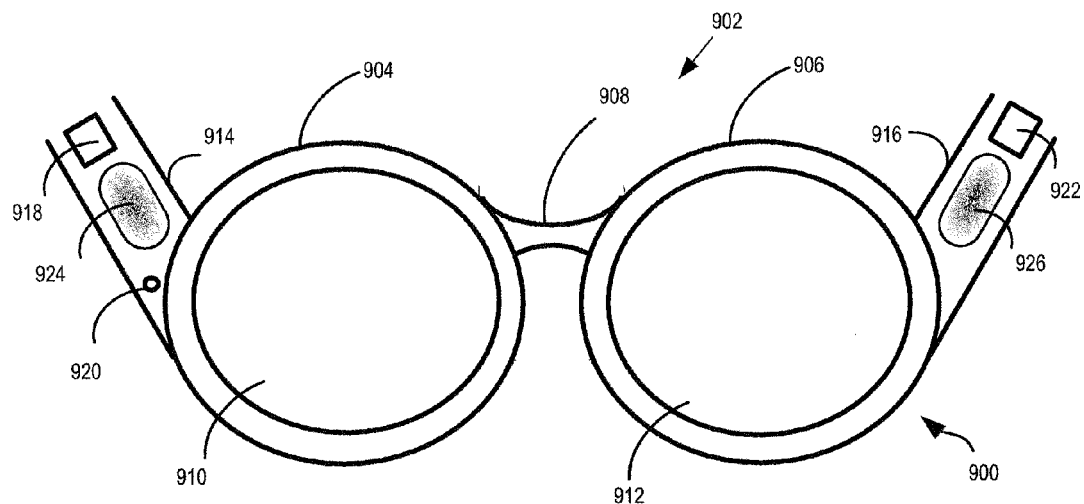
FIG. 9A and FIG. 9B illustrate an example system for capturing media data according to an embodiment of the invention.
Figure 9B:
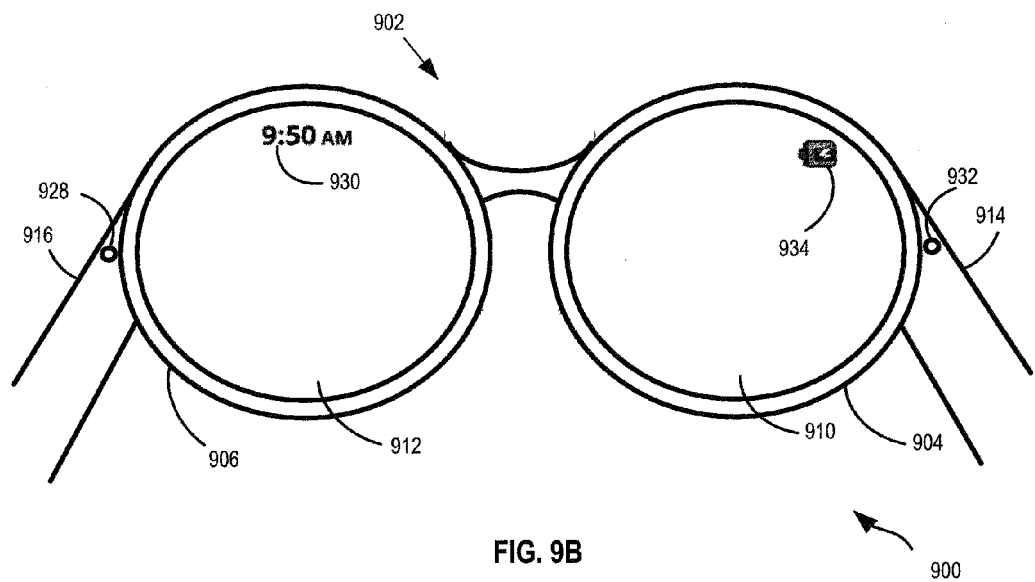

In this embodiment, mobile device 110 is able to capture digital image data with a digital camera (not shown) and capture audio data with a microphone (not shown) included in the mobile device. The captured digital image data may include still digital photographs, a series of digital photographs, recorded digital video, a live video feed, etc. The captured audio data may include audio samples, audio signatures, audio data associated with recorded video data, a live audio feed, etc. Mobile device 110 may be implemented as a binocular wearable computing device (as illustrated in FIGS. 9A and 9B), a monocular wearable computing device (i.e., a single eye head mounted display similar to those described in FIGS. 9A and 9B), as well as a cellular telephone, a tablet computer, or otherwise.

In one embodiment, digital image data may capture people, as well as real-world objects such as places or things, while digital audio data may capture music, conversations that convey data such as names, places, and news events, etc. As described in further detail below, embodiments of the invention capture said digital image data and/or digital audio data in response to identifying an event from sensor data received from a sensor included in mobile device 110 (not shown). Said sensor may capture location data, time data, image data, audio data, orientation data, etc. which corresponds to the location and time when the media data was captured. In some embodiments, the above described sensor is the same instrument that captures said media data.

In this embodiment, when mobile device 110 captures media data, such as digital image data and/or digital audio data, audio/visual based search client 112 transmits the captured media data and data identifying the event to search server 130. Audio/visual based search system 132 of search server 130 receives the media and sensor data, and performs one or more recognition processes on the media data, as discussed below.

In one embodiment, when audio/visual based search system 132 of search server 130 receives media data from the audio/visual based search client 112, it performs one or more image recognition processes on digital image data and/or performs one or more audio recognition processes on the digital audio data. For example, audio/visual based search system 132 may perform a facial recognition process on people within the digital image data or an image matching process on objects within the digital image data. Audio/visual based search system 132 may also (or alternatively) perform an audio recognition process on the audio data to determine whether a recorded or live song is playing, determine what words are being spoken, etc.

In one embodiment, when audio/visual based search system 132 identifies a specific person, a specific object (e.g., artwork, architecture, monuments, retail locations, etc.), a specific song, words indicative of location, words indicative of a person in simultaneously captured digital image, etc., it stores data indicative of the match in audio/visual based search history 134. The stored match is a record of a user experience in the real world. For example, when a person is matched within digital image data, audio/visual based search system 132 may store the event that caused the digital image data to be captured, the person's identity, the location where the digital image was captured, and the time the digital image was captured in a database record or searchable index within audio/visual based search history 134. Furthermore, the entry in audio/visual based search history 134 is stored along with the user identification data, such as user account, a unique ID, etc.

Mobile device 110 may continue to capture media data, in response to one or more identified events, and transmit the captured media data to search server 130. Said recognition processes are performed on the additional media data, and matches are stored in the audio/visual based search history 134. Since the audio and/or video data matches are stored in association with data identifying a user of mobile device 110, a history of user experiences in the real world captured by mobile device 110 is stored at audio/visual based search history 134. Said history of real-world user experiences is searchable, as discussed below.

In one embodiment, mobile device 110 is also responsible for receiving user queries to search audio/visual based search history 134 (other computing devices, such as a personal computer, laptop, tablet computer, smartphone, etc., may receive and transmit queries against a history of user experiences, as discussed below). The query may be a text based query entered into a user interface of audio/visual based search client 112, and transmitted by mobile device 110 to search server 130. The query may also be a spoken or audio query received by audio/visual based search client 112 via a microphone (not shown) of mobile device 110, and transmitted to search server 130. When the query is a spoken or audio query, audio/visual based search client 112 may either transmit the audio to search server 130, or mobile device 110 may parse the query to locate keywords which are then transmitted as a text-based query to search server 130.

Audio/visual based search system 132 may receive the user query from audio/visual based search client 112. As discussed above, when a query is a spoken or audio query that has not been parsed (i.e., the query is audio data), audio/visual based search system 132 parses the query to locate keywords, as discussed above. Audio/visual based search system 132 performs the search against the audio/visual based search history 134 for items relevant to the query and which are related to the user identification data associated with a user of mobile device 110. Audio/visual based search system 132 transmits results of the search to the mobile device for audio/visual based search client 112 to display to a user.

In one embodiment, the history of user experiences stored at audio/visual based search history 134 enable queries to be executed on a user's history of real-world experiences, such as "What was the playlist of songs at the party last night?," "What were the paintings I saw when I was on vacation in Paris?," "Who were the people at the business lunch this afternoon?," "How many books did I read in May?," etc. The queries enable a user to search and locate the people, places, and things that he or she has experienced.

In one embodiment, queries may be issued for histories across multiple users. For example, friends on a social networking website may specify that their user experience histories on audio/visual based search history 134 are available for searches by friends, the public, members of user groups, etc. Thus, a user might be able to enter queries such as "Where were my friends last night?", "What did John see on vacation?", etc.

In yet another embodiment, queries may be issued for histories that have been generated by multiple users. A group of users may be generating histories for a common purpose. For example, a group of security guards, airport screeners, etc. may generate histories while they are working. Then at a later point in time, a query such as "Show me the faces of all people that were seen between 1 P.M. and 3 P.M." may be entered by any member of the group, a supervisor in charge of the group, etc.

Figure 2:
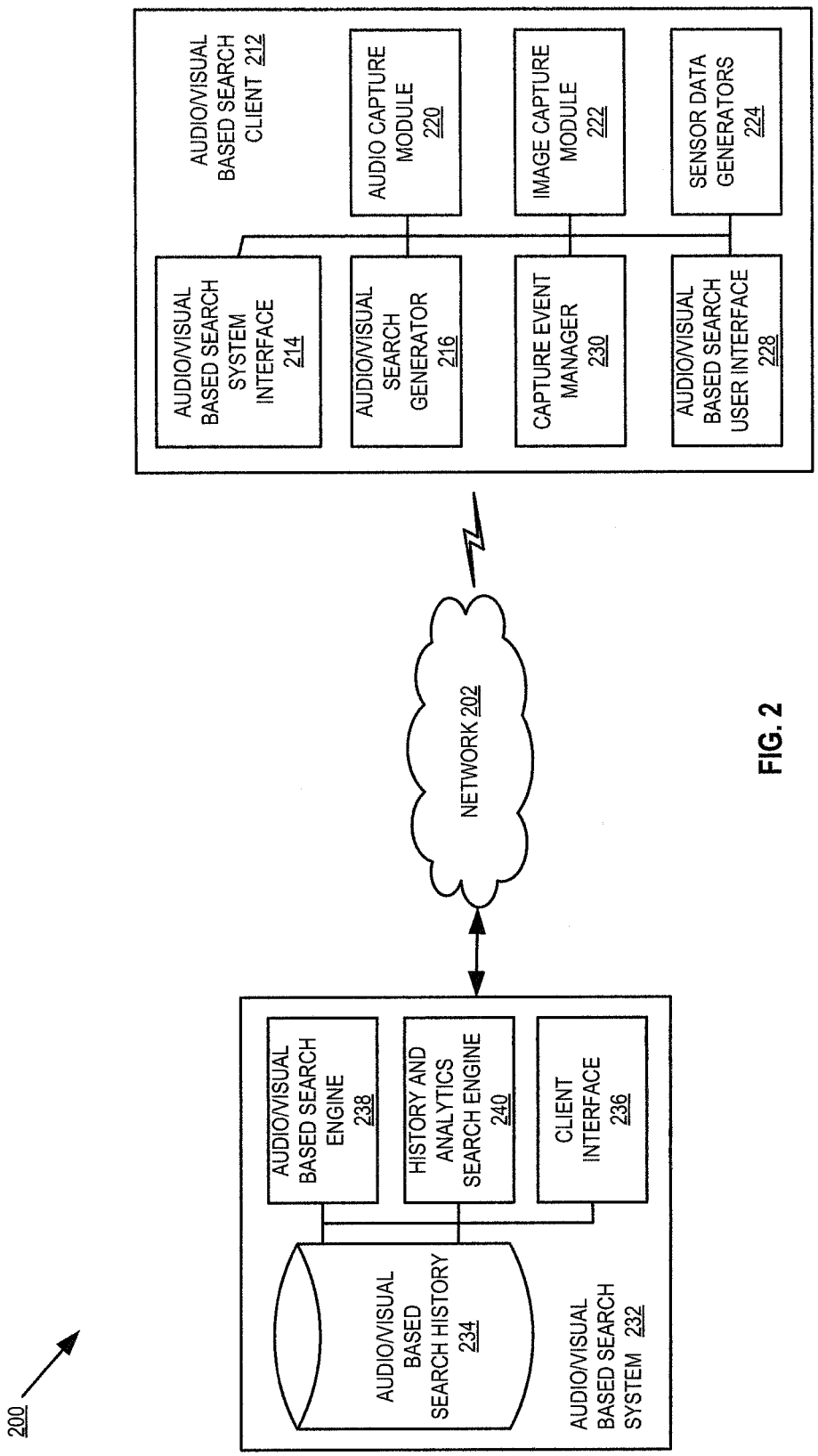
FIG. 2 is a block diagram of an audio/visual based search server and client having a capture event manager according to an embodiment of the invention.

FIG. 2 is a block diagram of an audio/visual based search server and client having a capture event manager according to an embodiment of the invention. Audio/visual based search client 212 and audio/visual based search system 232 of system 200 provide additional details for audio/visual based search client 112 and audio/visual based search system 132 discussed above in FIG. 1.

In this embodiment, audio/visual based search client 212 includes audio capture module 220, image capture module 222, sensor data generators 224, audio/visual search generator 216, audio/visual based search system interface 214, capture event manager 230, and audio visual based search user interface 228. Audio/visual based search system 232 may include client interface 236, history and analytics search engine 240, audio/visual based search engine 238, and audio/visual based search history 234. In one embodiment, audio/visual based search client 212 and audio/visual based search system 232 communicate with each other over various networks 202 and network configurations as discussed above in FIG. 1.

Capture event manager 230 receives sensor data from sensor data generators 224 to determine whether an event to trigger media data capture (alternatively referred to herein as "media data capture events") has occurred. In some embodiments, sensor data generators 224 utilize an image sensor to capture image data, and capture event module 230 performs image processing to determine if a person or object of interest is included in the image data—e.g., the image data includes a person known by the user, a person that user has never encountered, an object of interest, a new object, an unknown object, etc. In some embodiments, sensor data generators 224 utilize an audio sensor to capture audio data, and capture event module 230 performs audio processing to determine, e.g., whether a recorded or live song is playing, determine what words are being spoken, identify a person speaking, recognizing a loud or unusual sound, etc. In some embodiments, sensor data generators 224 capture location data (captured, for example, from a Global Positioning System (GPS) or via Cell Tower triangulation) and capture event module 230 processes said location data to determine the location of the client device.

Thus, based on the sensor data received from sensor data generators 224, capture event module 230 determines whether a media data capture event has occurred. For example, capture event module 230 may analyze sensor data to determine if an audio or visual event is likely to have occurred (e.g., a loud or unusual sound detected, an object detected similar but different from object included in the history of user experiences). Capture event module 230 may further detect a derivation in the devices' location based on a known history of previous location and "routes" taken by the user. For example, embodiments of the invention may detect that the client device is located in a location with few or no corresponding media data files from the history of user experiences, or detect that the user has deviated from his normal route to and from a know location (e.g., from work to home), and initiate media data capture in response to this detection.

In one embodiment, capture event manager 230 enables a user to define events that trigger the capture of media data, e.g., a designated time period, upon encountering a person, place, or object of interest, etc. Capture event manager 230 may further enable a user to set location based preferences where media data is to be captured. For example, when a mobile device is in Mountain View, Calif., the client device may be set to continuously, or at regular periodic intervals, capture media data without a user initiating the media capture. In another example, capture event manager 230 may monitor a user's current location to determine if he/she is in a popular location (e.g., one in which a certain number of other users have captured media data for experience histories). When the user is determined to be within a popular location, capture event manager 230 may automatically turn on media data capture without action from the user.

Capture event manager 230 may also be set to continuously or periodically capture media data for a specific interval of time. For example, media may be continuously captured for two hours after a specific event (e.g., after arriving at a specific location, in response to a user command, etc.). In yet another embodiment, a user may set media capture to always on, so that audio capture module 220 and image capture module 222 are continuously capturing media data without a user initiating the media capture, and capture event manager 230 is to select segments based on detected events. In one embodiment, capture event manager 230 may change the settings for media data capture between the modes discussed above based on current conditions of a battery of the mobile client device. Preferences settings may be received, changed, updated, etc. via a user interface provided by audio/visual based search user interface 228.

In response to the capture of media and based on the preferences set within capture event manager 230, audio/visual search generator 216 prepares the captured media data for transmission to audio/visual based search system 232. In one embodiment, audio/visual search generator 216 generates digital signatures for objects within image data captured by image capture module 222, selects audio samples or generates digital signatures from audio data captured by audio capture module 220, and obtains data from sensor data generators 224, such as location data, time data, acceleration data, etc. Audio/visual search generator 216 combines the media data with the sensor data, which are then transmitted by audio/visual based search system interface to client interface 236 of audio/visual based search system 232.

When audio/visual based search engine 238 receives digital image data and/or audio data, audio/visual based search engine 238 generates digital signatures for objects within the received image data and selects audio samples from the received audio data. However, as discussed above, audio/visual based search engine 238 may also receive image signatures and audio samples, and thus does not generate the signatures and samples. In one embodiment, audio/visual based search engine 238 utilizes the digital image signatures and/or audio samples to perform one or more recognition processes on the media data to attempt to determine specific objects, people, things, etc. within digital image data, or determine words, a song title, people's names, etc., within audio data. For example, audio/visual based search engine 238 may utilize the image signatures and/or audio samples to search visual and audio search servers, databases, indexes, etc. (not shown). When audio/visual based search engine 238 finds a match, indicating that an object within image data or a sound within audio data has been recognized, audio/visual based search engine 238 stores the results in audio/visual based search history 234. In one embodiment, audio/visual based search engine 238 also stores user identification data and media capture event data (based on received sensor data, such as location, time, persons/objects of interest etc.) along with the match results. As discussed above, as more matches are found for media data captured by the user, a history of user experiences is created by audio/visual based search system 232.

In this embodiment, a user is enabled to search an associated history of user experiences by generating search queries via audio/visual based search user interface 228. Audio/visual based search user interface 228 may receive queries in the form of text inputted by the user. Audio/visual based search user interface 228 may also receives queries in the form of audio input received by audio capture module. For example, voice command based searching may be received by audio/visual based search user interface 228 in the form of spoken word; audio/visual based search user interface 228 parses the voice command based search to locate keywords. Based on the keywords, audio/visual based search user interface 228 generates a keyword based search query. Regardless of the way a query is generated, audio/visual based search system interface 214 transmits the query to client interface 236.

In one embodiment, history and analytics search engine 240 receives the search query from client interface 236. History and analytics search engine 240 then performs the search on audio/visual based search history 234 associated with the user who generated the search. Because the audio/visual based search history stores a history of user experiences including the above described media data capture events, history and analytics search engine 240 may execute searches such as "How many books did I read last month?", "Who was at the club this weekend?", "What buildings did I see in Sydney, Australia?", etc. History and analytics search engine 240 receives results of the search, and client interface 236 transmits the results to audio/visual based search client 212, which are displayed to a user via audio/visual based search user interface 228.

Figure 3:
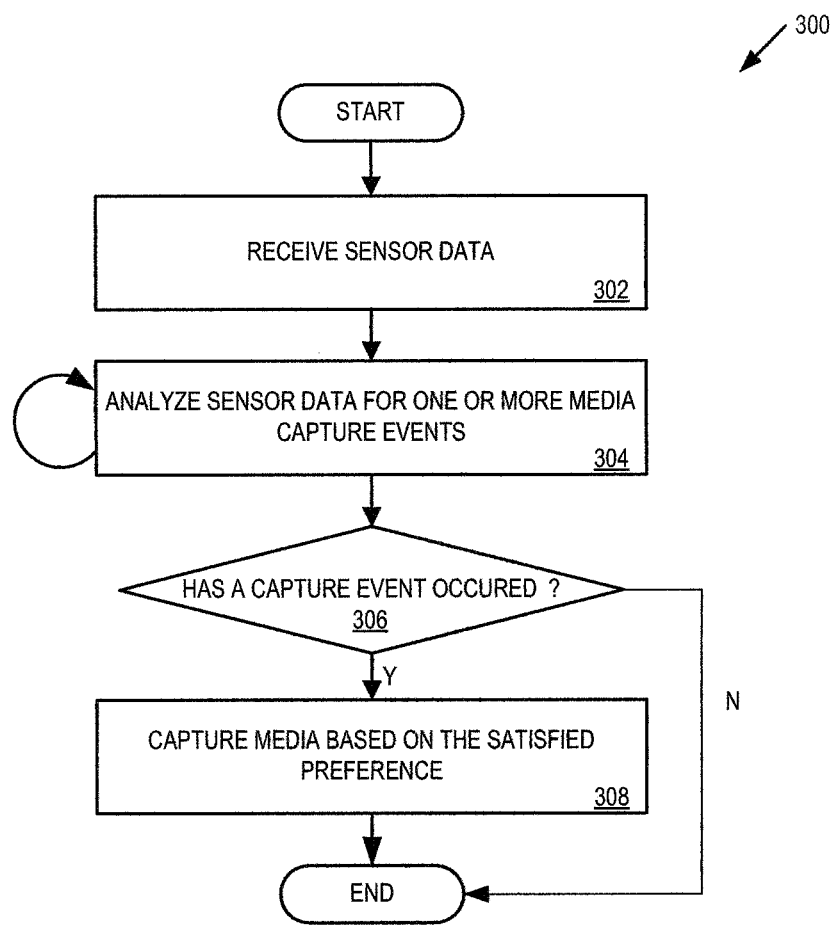
FIG. 3 is a flow diagram of a process for capturing media data according to an embodiment of the invention.

FIG. 3 is a flow diagram of a process for capturing media data according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Method 300 is performed by processing logic that may comprise hardware (circuitry, dedicated logic, etc.), software (such as is run on a general purpose computer system or a dedicated machine), firmware, or a combination. In one embodiment, method 300 is performed by an audio/visual based search client (e.g., audio/visual based search client 112 or 212, as shown in FIGS. 1 and 2 respectively).

Method 300 begins by receiving sensor data from a sensor included in a mobile device (processing block 302). The mobile device may be a cellular telephone, tablet computer, monocular wearable processing system, binocular wearable processing system, etc. As described above, the sensor data may include audio data captured from a microphone, image data captured from an image sensor (e.g., a digital camera), location data (captured, for example, from a Global Positioning System (GPS) or via Cell Tower triangulation), etc.

In response to receiving the sensor data, the mobile computing device analyzes the sensor data to determine if one or more media capture events has occurred (processing block 304). The user of the mobile computing device may define a media capture event—e.g., if a person, place or object is recognized via the audio or visual data. In some embodiments, the mobile computing device executes logic or modules to determine whether a media capture event has occurred without requiring the user to define a media capture event. For example, a media capture event may occur when the mobile computing device enters a new or known location, encounters a new or known person or object, etc.

In response to determining that a capture event has occurred (processing block 306), the mobile computing device captures media data based on the event (processing block 308). For example, in response to some events, the mobile computing device may capture either image data or audio data only, while in response to other events, the mobile computing device may capture video data comprising image data and audio data.

Figure 4:
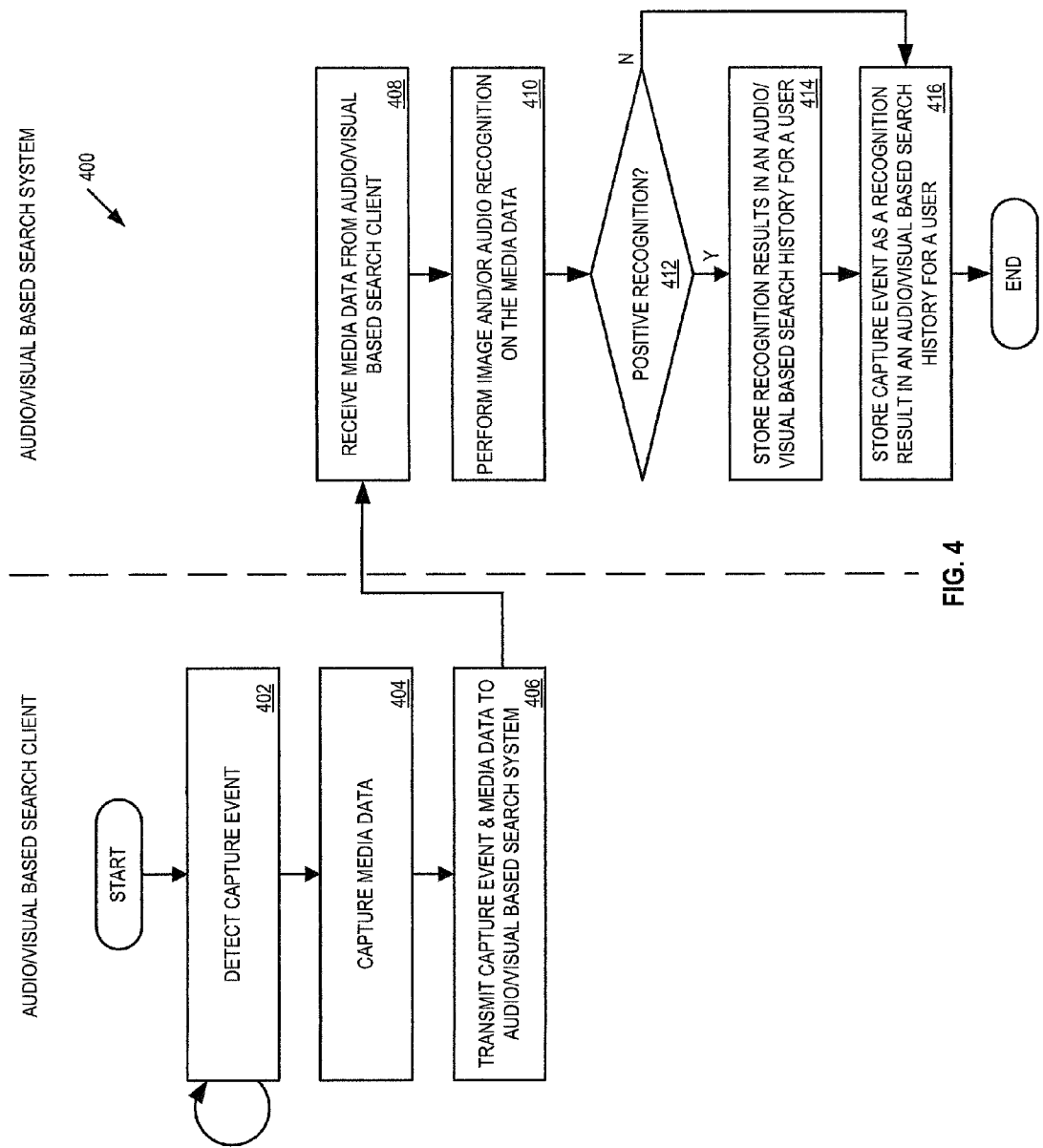
FIG. 4 is a flow diagram of a process for adding to a searchable history of user experiences in response to a media data capture event according to an embodiment of the invention.

FIG. 4 is a flow diagram of a process for adding to a searchable history of user experiences in response to a media data capture event according to an embodiment of the invention. Process 400 is performed by processing logic that may comprise hardware (circuitry, dedicated logic, etc.), software (such as is run on a general purpose computer system or a dedicated machine), firmware, or a combination. Process 400 may be performed by an audio/visual based search client and an audio/visual based search system (e.g., audio/visual based search client 112 or 212, and audio/visual based search system 132 or 232 as shown in FIGS. 1 and 2).

It is determined if one or more media capture events has occurred (processing block 402) based on sensor data. Said one or more media capture events comprise real-world events associated with a user of a mobile device. In response to determining that a capture event has occurred, the mobile computing device captures media data based on the event (processing block 404). Said media data may include video data, pictures, audio samples, etc.

Processing logic transmits the captured media data and data identifying the media capture event to an audio/visual based search system (processing block 406). In one embodiment, processing logic generates digital signatures of objects within digital image data, and selects audio samples from digital audio data, which are transmitted to audio visual based search system.

Processing logic receives the media capture event data and the captured media data from the audio/video visual based search client (processing block 408). In one embodiment, where processing logic receives media data and not image signatures and/or audio samples, processing logic generates the digital signatures for the objects within the received digital image data, and selects audio samples from received digital audio data. Processing logic performs image and/or audio recognition on the media data (processing block 410). In one embodiment, processing logic utilizes the digital image signatures to search for real world objects, people, or other objects with matching image signatures. Furthermore, processing logic utilizes samples of audio to search for audio, such as songs, voice, etc., that match the audio samples.

Processing logic then determines whether a person, object, or sound has been recognized (processing block 412). When a match is found, and thus a person, object, or sound within the media data has been identified, processing logic stores the results in an audio/visual based search history for a user (processing block 414). When there is no match within the media data for faces, objects, or audio, the process ends by adding only the media capture event to the audio/visual based search history for the user (processing block 416).

In one embodiment, each transfer of media data, digital signatures, or audio samples from the audio/visual based search client is accompanied by user identification data, such as a user name and password, unique identification data associated with the user, etc.; thus, each matched result is associated with a specific user. As additional media data is matched and associated with a user, a history of a user's real-world experiences is created. That is, a record of what a user has seen and heard is created to enable the searching of the user's history.

In one embodiment, a group of users may be associated with the same history. For example, a group of security guards, airport screeners, family members, corporate employees, etc. may be associated with a history of user experiences. Then each of the experiences of the individual members in the group is added to the single history in order to provide a more thorough history over a period of time from several vantage points. Furthermore, when the history is searched, the ensuing multiple inputs to the search history ensure a more thorough coverage of real-world events that are relevant to the group.

Figure 5:
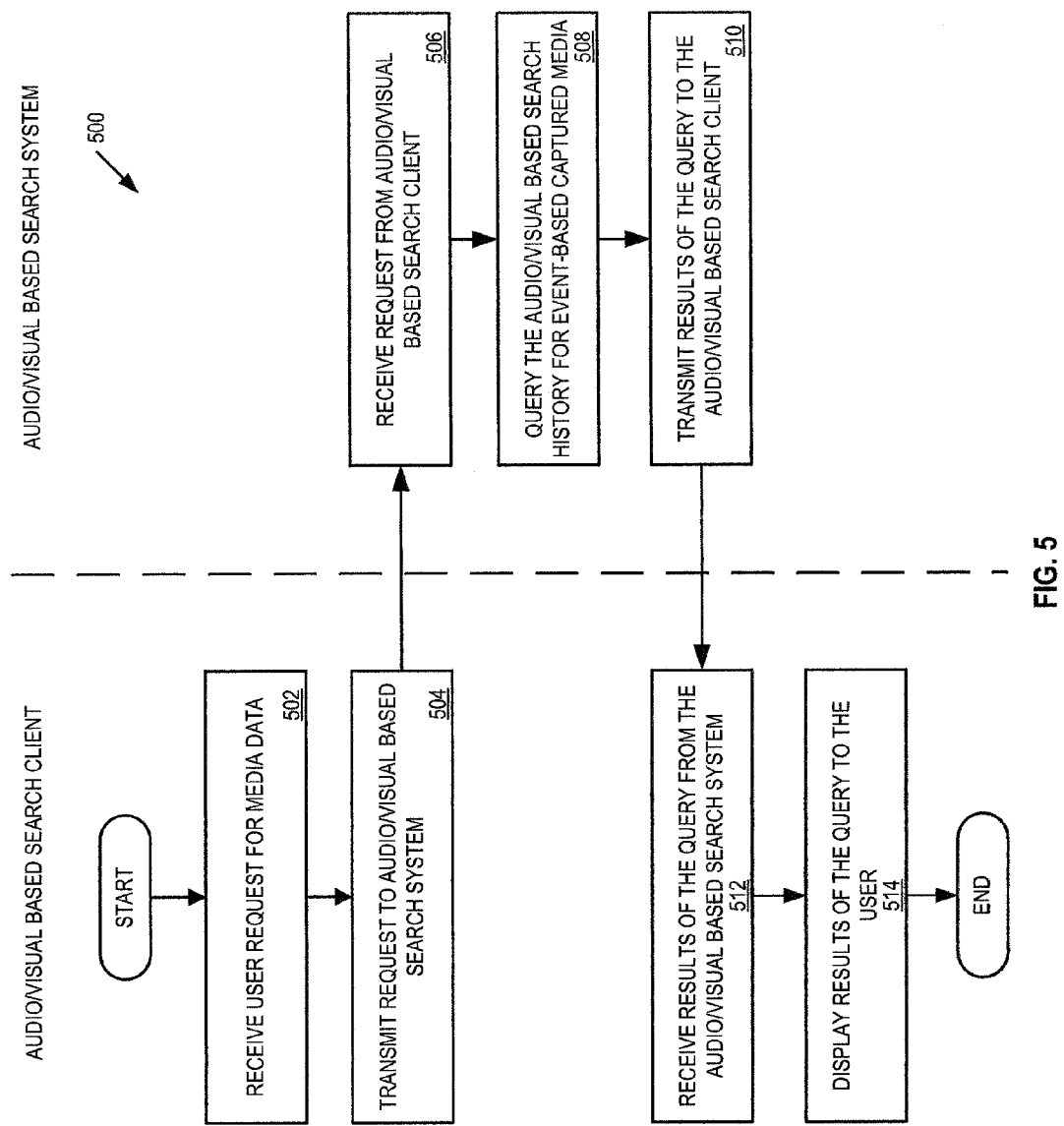
FIG. 5 is a flow diagram of a process to search and identify captured media data from a history of user experiences according to an embodiment of the invention.

FIG. 5 is a flow diagram of a process to search and identify captured media data from a history of user experiences according to an embodiment of the invention. Process 500 begins by receiving a user search for media data (processing block 502) related to a real-world experience of the user. The search is to be executed on a history of the user's real-world experiences and media capture events, which have been captured and recorded in an audio/visual based search history. For example, the search may include searches such as "Show me media data related to the party I attended last night?," "What songs were playing at the club last weekend?," "Show me all artwork I saw in Vienna?," etc. In another embodiment, the user is presented with a list of media capture events; the user selects one of the events, which is interpreted as a search for captured media data related to that event.

Processing logic then transmits the search to an audio/visual based search system (processing block 504). The search is received from the audio visual based search client (processing block 506) and processing logic queries an audio/visual based search history based on the received search (processing block 508). For example, a search might request "Show me all artwork I saw in Vienna?" Processing logic would query the audio/visual based search history for image matches within a user's history for artwork associated with the event of the user being in Vienna, Austria. As another example, a search might request "What was the playlist at the club last night?" Processing logic would query the audio/visual based search history for audio matches that include song titles for an event related to the user being at the location specified in the search (i.e., "the club last night"). Processing logic transmits results of the query to the audio/visual based search client (processing block 510).

Processing logic receives the results of the query from the audio/visual based search system (processing block 512) and displays the results of the query to the user (processing block 514). In one embodiment, the results of the query display data indicative of the media data in the user history of real world experiences. For example, query results that include digital images or video data may include the display of thumbnail images indicative of the image data or a sample of video data. As another example, query results that include audio data may include the display of album artwork that corresponds to matched songs in the history of user experiences. In one embodiment, processing logic displays the results in a graphical user interface to a user. For example, the results display may be displayed on a map indicating the locations where matches relevant to the query have occurred, along a timeline illustrating the relationship between when matches relevant to the query have occurred, displayed in a slider that enables a user to browse a plurality of different matches relevant to the query, etc.

Figure 6:
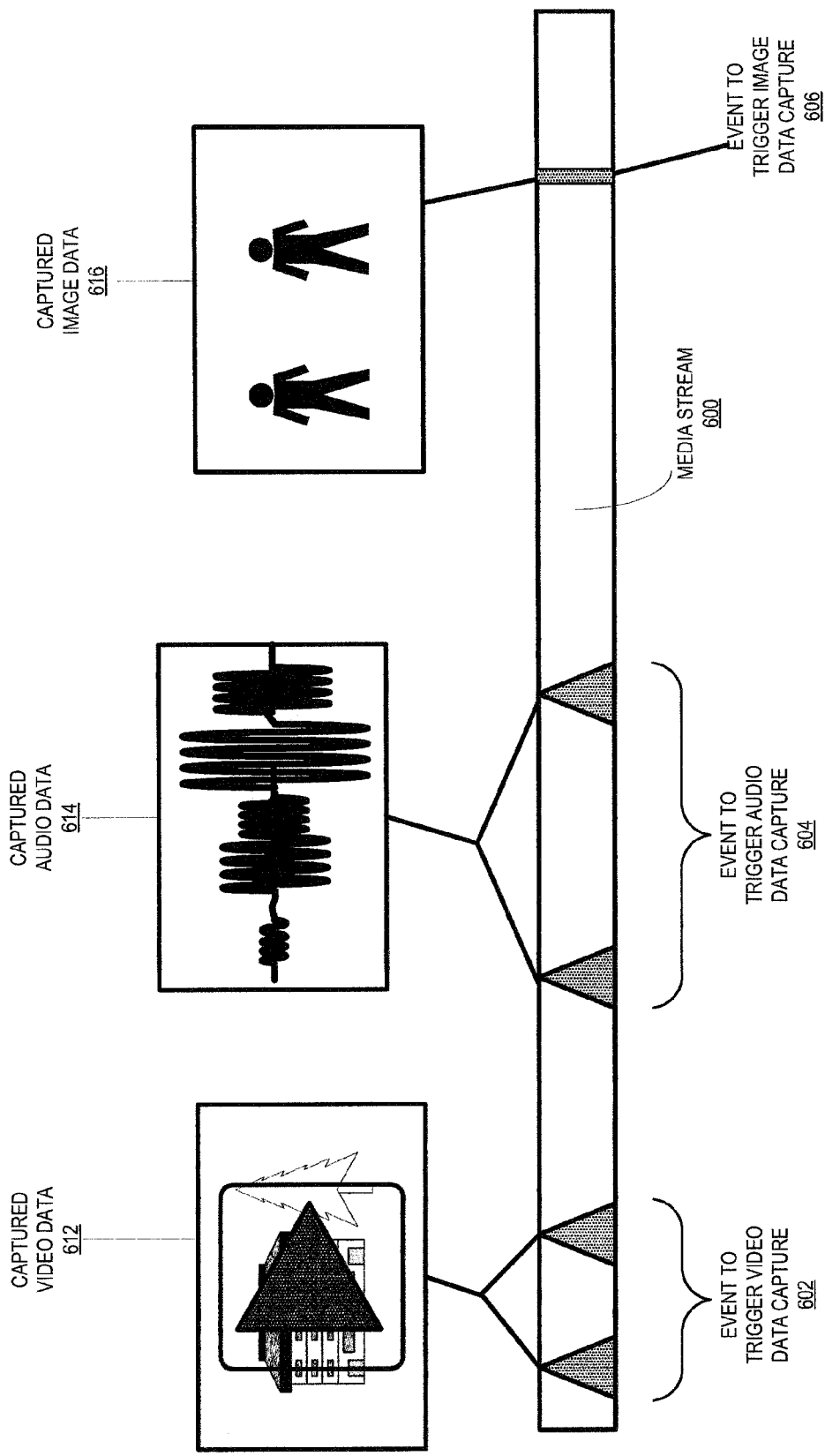
FIG. 6 is an illustration of media data capture according to an embodiment of the invention.

FIG. 6 is an illustration of media data capture according to an embodiment of the invention. In this example, media stream 600 is recorded by a sensor included in a mobile computing device. Said media stream may include both audio and video data and may be temporarily stored in a region of memory that is continuously overwritten unless a media data capture event has occurred (e.g., media stream 600 may be stored in certain amount of volatile memory, and stored to non-volatile memory in the event of a media data capture event).

In this illustrated example, event 602 occurs and is defined to capture video data. Thus, captured video data 612 is "segmented" from media stream 600 and is added to the user's history of real-world experiences (as described above). Depending on the length of captured video data 612, the resultant media file may be segmented (i.e., cropped) from stream 600 as shown, or may be a continuous accumulation of video data of various media stream segments, including stream 600.

As further illustrated in this example, event 604 occurs and is defined to capture audio data 614. In this example, audio data 614 is either added to the user's history of real-world experience; audio data 614 may additionally or alternately be processed to identify data related to a real-world experience (e.g., captured audio data 614 is used to identify a song playing at a location).

As further illustrated in this example, event 606 occurs and is defined to capture image data 616. In this example, image data 616 is either added to the user's history of real-world experience; image data 616 may additionally or alternatively be processed to identify data related to a real-world experience (e.g., captured image data 614 is used to identify persons meeting with the user at a location).

Figure 7:
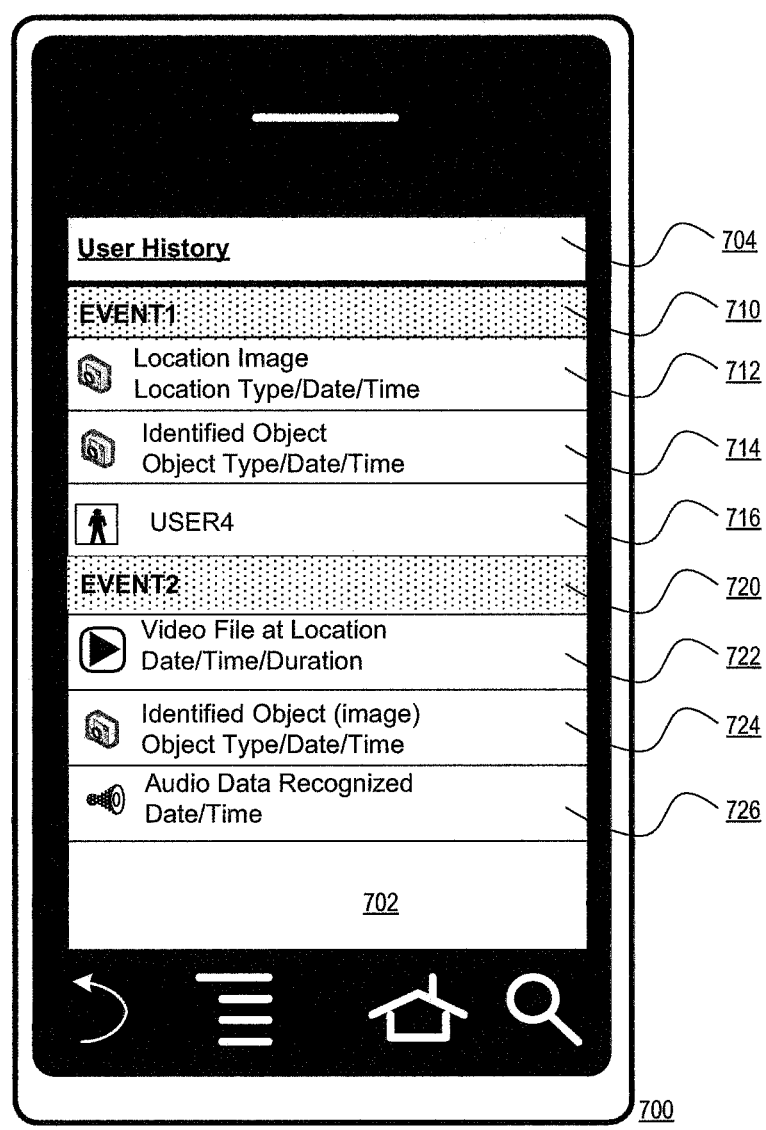
FIG. 7 is an illustration of a display of media capture event data according to an embodiment of the invention.

FIG. 7 is an illustration of a display of media capture event data according to an embodiment of the invention. In this embodiment, user history 704 is shown on display 702 of mobile computing device 700. In this example, mobile computing device is shown to be a mobile device a touch-screen interface, such as a smartphone or a tablet computer; in other embodiments, said mobile computing device may be a laptop computer, a monocular wearable processing system, a binocular wearable processing system, etc.

In this embodiment, user history 704 is generated in response to a user query for media data related to capture media data events, which are shown as event 710 ('EVENT1') and event 720 ('EVENT2'). In this example, said events are shown in chronological order; in other embodiments, events may be display based on relevance to the respective user query, amount of media data files associated with each event, etc.

Event 710 is shown to have triggered the capture of location image 712. In this embodiment, said image was further processed to identify an object, and the positive identification of this object is shown as item 714; image 712 was further processed to identify a known contact of the user, shown as item 716 and identified as 'USER4.' Said known contact may be identified in a manner consistent with an address book of the user stored on mobile device 700, a social networking service, etc.

Event 720 is shown to have triggered the capture of video file 722. Said video file is processed to identify an object from user history, and the positive identification of this object is shown as item 724. Said item may be image data extracted from video file 722, an image file unrelated to the event but included in a history of real-world experiences of the user, an image taken from another user associated with the same history, etc. In this example, audio data from video file 722 is further processed to identify a known audio file (e.g., a song), shown as item 726.

Figure 8:
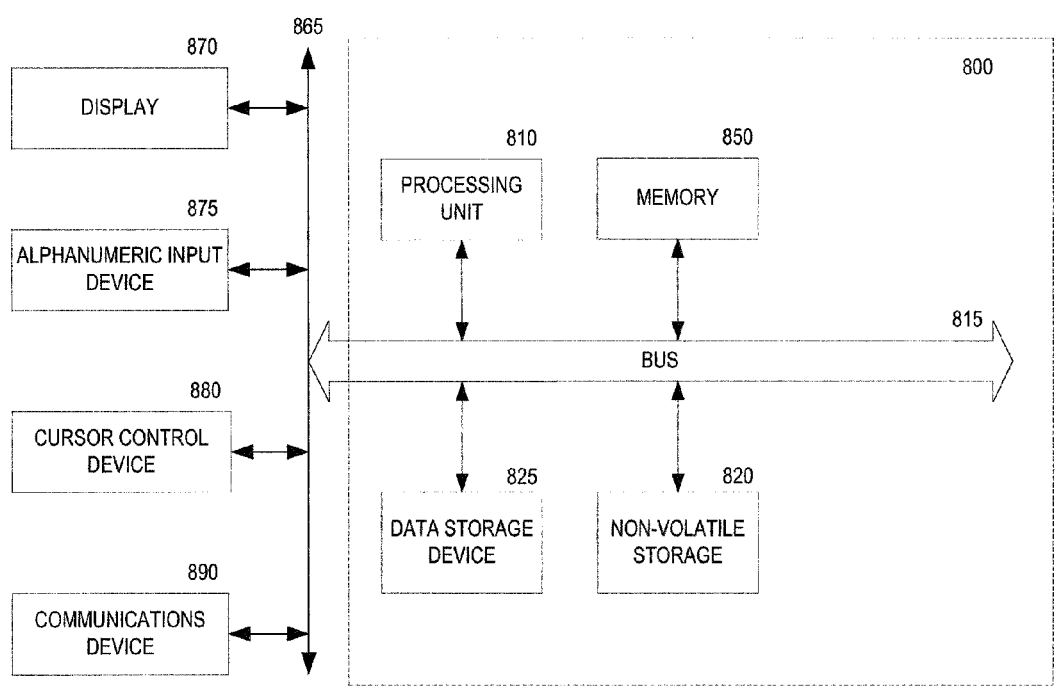
FIG. 8 is an illustration of a mobile computing device to utilize an embodiment of the invention.

FIG. 8 is an illustration of a mobile computing device to utilize an embodiment of the invention. Platform 800 as illustrated includes bus or other internal communication means 815 for communicating information, and processor 810 coupled to bus 815 for processing information. The platform further comprises random access memory (RAM) or other volatile storage device 850 (alternatively referred to herein as main memory), coupled to bus 815 for storing information and instructions to be executed by processor 810. Main memory 850 also may be used for storing temporary variables or other intermediate information during execution of instructions by processor 810. Platform 800 also comprises read only memory (ROM) and/or static storage device 820 coupled to bus 815 for storing static information and instructions for processor 810, and data storage device 825 such as a magnetic disk or optical disk and its corresponding disk drive. Data storage device 825 is coupled to bus 815 for storing information and instructions.

Platform 800 may further be coupled to display device 870, such as a cathode ray tube (CRT) or a liquid crystal display (LCD) coupled to bus 815 through bus 865 for displaying information to a computer user. Alphanumeric input device 875, including alphanumeric and other keys, may also be coupled to bus 815 through bus 865 for communicating information and command selections to processor 810. An additional user input device is cursor control device 880, such as a mouse, a trackball, stylus, or cursor direction keys coupled to bus 815 through bus 865 for communicating direction information and command selections to processor 810, and for controlling cursor movement on display device 870. In embodiments utilizing a touch screen interface, it is understood that display 870, input device 875 and cursor control device 880 may all be integrated into a touch-screen unit.

Another device, which may optionally be coupled to platform 800, is a communication device 890 for accessing other nodes of a distributed system via a network. Communication device 890 may include any of a number of commercially available networking peripheral devices such as those used for coupling to an Ethernet, token ring, Internet, or wide area network. Communication device 890 may further be a null-modem connection, or any other mechanism that provides connectivity between computer system 800 and the outside world. Note that any or all of the components of this system illustrated in FIG. 8 and associated hardware may be used in various embodiments of the invention.

It will be appreciated by those of ordinary skill in the art that any configuration of the system illustrated in FIG. 8 may be used for various purposes according to the particular implementation. The control logic or software implementing embodiments of the invention can be stored in main memory 850, mass storage device 825, or other storage medium locally or remotely accessible to processor 810.

It will be apparent to those of ordinary skill in the art that any system, method, and process to capture media data as described herein can be implemented as software stored in main memory 850 or read only memory 820 and executed by processor 810. This control logic or software may also be resident on an article of manufacture comprising a computer readable medium having computer readable program code embodied therein and being readable the mass storage device 825 and for causing processor 810 to operate in accordance with the methods and teachings herein.

Embodiments of the invention may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the invention for such a device would be apparent to one of ordinary skill in the art given the disclosure of the present invention as provided herein.

Embodiments of the invention may also be embodied in a special purpose appliance including a subset of the computer hardware components described above. For example, the appliance may include processor 810, data storage device 825, bus 815, and memory 850, and only rudimentary communications mechanisms, such as a small touch-screen that permits the user to communicate in a basic manner with the device. In general, the more special-purpose the device is, the fewer of the elements need be present for the device to function.

FIGS. 9A and 9B illustrate an example system for capturing media data according to an embodiment of the invention. System 900 is shown in the form of a wearable computing device. While illustrated as eyeglasses 902, other types of wearable computing devices could additionally or alternatively be used, such as a monocular wearable computing device with a single eye head mounted display. Eyeglasses 902 comprise frame elements including lens-frames 904 and 906 and center frame support 908, lens elements 910 and 912, and extending side-arms 914 and 916. Center frame support 908 and extending side-arms 914 and 916 are configured to secure eyeglasses 902 to a user's face via a user's nose and ears, respectively. Each of frame elements 904, 906, and 908 and extending side-arms 914 and 916 may be formed of a solid structure of plastic or metal, or may be formed of a hollow structure of similar material so as to allow wiring and component interconnects to be internally routed through eyeglasses 902. Each of lens elements 910 and 912 may be formed of any material that can suitably display a projected image or graphic. Each of lens elements 910 and 912 may also be sufficiently transparent to allow a user to see through the lens element. Combining these two features of the lens elements can facilitate an augmented reality or heads-up display where the projected image or graphic is superimposed over a real-world view as perceived by the user through the lens elements.

Extending side-arms 914 and 916 are each projections that extend away from frame elements 904 and 906, respectively, and are positioned behind a user's ears to secure eyeglasses 902 to the user. Extending side-arms 914 and 916 may further secure eyeglasses 902 to the user by extending around a rear portion of the user's head. Additionally or alternatively, for example, system 900 may connect to or be affixed within a head-mounted helmet structure. Other possibilities exist as well.

System 900 may also include on-board computing system 918, video camera 920, sensor 922, and finger-operable touch pads 924, 926. On-board computing system 918 is shown to be positioned on extending side-arm 914 of eyeglasses 902; however, on-board computing system 918 may be provided on other parts of eyeglasses 902. On-board computing system 918 may include a processor and memory, for example. On-board computing system 918 is configured to receive and analyze data from video camera 920 and finger-operable touch pads 924, 926 (and possibly from other sensory devices, user interfaces, or both) and generate images for output from lens elements 910 and 912.

Video camera 920 is shown to be positioned on extending side-arm 914 of eyeglasses 902; however, video camera 920 may be provided on other parts of eyeglasses 902. Video camera 920 may be configured to capture images at various resolutions or at different frame rates based on media data capture events, as described above. Many video cameras with a small form-factor, such as those used in cell phones or webcams, for example, may be incorporated into an example of system 900. Although FIG. 9A illustrates one video camera, more video cameras may be used, and each may be configured to capture the same view, or to capture different views. For example, video camera 920 may be forward facing to capture at least a portion of the real-world view perceived by the user. This forward facing image captured by video camera 920 may then be used to generate an augmented reality where computer generated images appear to interact with the real-world view perceived by the user.

Sensor 922 is shown mounted on extending side-arm 916 of eyeglasses 902; however, sensor 922 may be provided on other parts of eyeglasses 902. Sensor 922 may include one or more of a gyroscope or an accelerometer, for example. Other sensing devices may be included within sensor 922 or other sensing functions may be performed by sensor 922.

Finger-operable touch pads 924, 926 are shown mounted on extending side-arms 914, 916 of eyeglasses 902. Each of finger-operable touch pads 924, 926 may be used by a user to input commands. Finger-operable touch pads 924, 926 may sense at least one of a position and a movement of a finger via capacitive sensing, resistance sensing, or a surface acoustic wave process, among other possibilities. Finger-operable touch pads 924, 926 may be capable of sensing finger movement in a direction parallel or planar to the pad surface, in a direction normal to the pad surface, or both, and may also be capable of sensing a level of pressure applied. Finger-operable touch pads 924, 926 may be formed of one or more translucent or transparent insulating layers and one or more translucent or transparent conducting layers. Edges of finger-operable touch pads 924, 926 may be formed to have a raised, indented, or roughened surface, so as to provide tactile feedback to a user when the user's finger reaches the edge of finger-operable touch pads 924, 926. Each of finger-operable touch pads 924, 926 may be operated independently, and may provide a different function.

FIG. 9B illustrates an alternate view of the system 900. Eyeglasses 902 may include projector 928 coupled to an inside surface of extending side-arm 916 and configured to project display 930 onto an inside surface of lens element 912. Additionally or alternatively, a projector may be coupled to an inside surface of extending side-arm 914 and configured to project display 934 onto an inside surface of lens element 910.

Lens elements 910 and 912 may act as a combiner in a light projection system and may include a coating that reflects the light projected onto them from projectors 928 and 932. In some embodiments, a special coating may not be used (e.g., when projectors 928 and 932 are scanning laser devices).

In alternative embodiments, other types of display elements may also be used. For example, lens elements 910, 912 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within frame elements 904 and 906 for driving such a matrix display. Alternatively or additionally, a laser or LED source and scanning system could be used to draw a raster display directly onto the retina of one or more of the user's eyes. Other possibilities exist as well.

Figure 10:
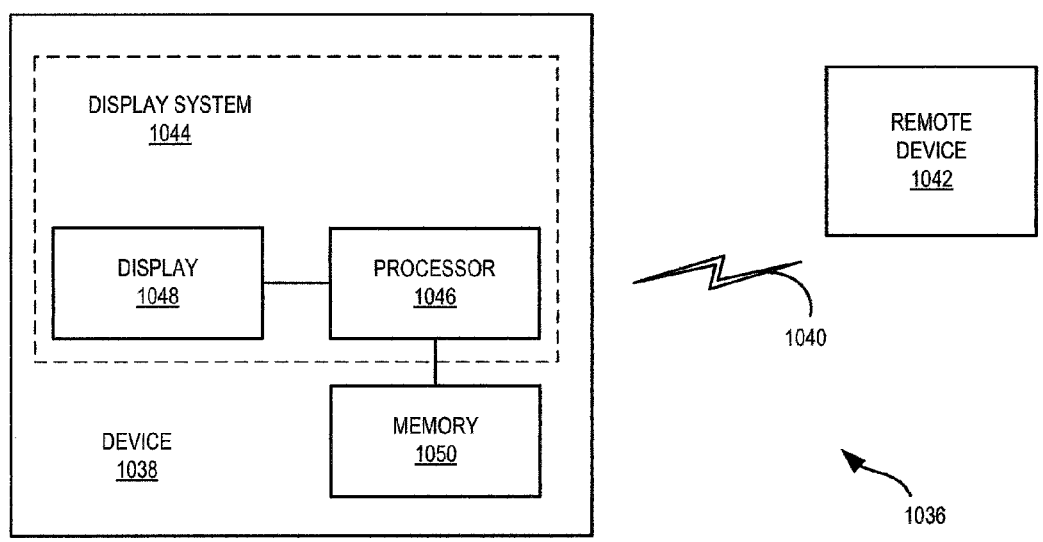
FIG. 10 illustrates an example computer network infrastructure for capturing and transmitting media data according to an embodiment of the invention.

FIG. 10 illustrates an example computer network infrastructure for capturing and transmitting captured media data according to an embodiment of the invention. In system 1036, device 1038 communicates using communication link 1040 (e.g., a wired or wireless connection) to remote device 1042. Device 1038 may be any type of device that can receive data and display information corresponding to or associated with the data. For example, device 1038 may be a heads-up display system, such as the eyeglasses 902 shown in FIGS. 9A and 9B.

Device 1038 includes display system 1044 comprising processor 1046 and display 1048. Display 1048 may be, for example, an optical see-through display, an optical see-around display, or a video see-through display. Processor 1046 may receive data from remote device 1042, and configure the data for display. Processor 1046 may be any type of processor, such as a micro-processor or a digital signal processor, for example.

Device 1038 may further include on-board data storage, such as memory 1050 coupled to processor 1046. Memory 1050 may store software that can be accessed and executed by processor 1046, for example.

Remote device 1042 may be any type of computing device or transmitter including a laptop computer, a mobile telephone, etc., that is configured to transmit data to device 1038. Remote device 1042 and device 1038 may contain hardware to enable communication link 1040, such as processors, transmitters, receivers, antennas, etc.

Communication link 1040 is illustrated as a wireless connection; however, wired connections may also be used. For example, communication link 1040 may be a wired link via a serial bus such as a universal serial bus or a parallel bus. A wired connection may be a proprietary connection as well. Communication link 1040 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Remote device 1042 may be accessible via the Internet and may comprise a computing cluster associated with a particular web service (e.g., social-networking, photo sharing, address book, etc.) to receive captured media data as described above.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the method operations. The required structure for a variety of these systems will appear from the description above. In addition, embodiments of the invention are not described with reference to any particular programming language. It will be appreciated that a variety of programming languages may be used to implement the teachings of the invention as described herein.

The present description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

The invention claimed is:

1. A method comprising:
    receiving sensor data from a sensor included in a mobile computing device;
    identifying a person, object, or place from the sensor data;
    identifying an event from the sensor data based, at least in part, on whether the identified person, object, or place is included in a history of real-world experiences of a user of the mobile computing device;
    initiating the mobile computing device to capture media data in response to identifying the event from the sensor data;
    associating the media data captured by the mobile computing device with the event; and
    transmitting media capture event data identifying the event and the media data associated with the event to a server computer system for adding the media capture event data and the media data associated with the event to the history of real-world experiences of the user of the mobile computing device.

2. The method of claim 1, wherein the mobile computing device comprises a user wearable computing device including a head mounted display.

3. The method of claim 1, wherein the sensor data includes audio data, and identifying the person, object, or place from the sensor data comprises parsing the audio data to identify one or more key words from the audio data.

4. The method of claim 1, wherein the sensor data includes image data, and identifying the person, object, or place from the sensor data comprises performing a recognition process to identify the object from the image data.

5. The method of claim 1, wherein the sensor data comprises a media data stream, and initiating the mobile computing device to capture media data in response to identifying the event from the sensor data comprises storing a segment of the media data stream.

6. The method of claim 1, wherein the sensor data includes location data and the event comprises the sensor being proximate to a specific location.

7. The method of claim 1, further comprising:
    transmitting a query of the user of the mobile computing device to the server computer system for initiating a search of one or more events included in the history of real-world experiences of the user; and
    receiving results relevant to the query that include data indicative of the one or more events and media data associated with the one or more events included in the history of real-world experiences of the user.

8. The method of claim 1, wherein the media data includes one or more of digital image data and digital audio data.

9. A non-transitory computer readable storage medium including instructions that, when executed by a processor, cause the processor to perform a method comprising:
    receiving sensor data from a sensor included in a mobile computing device;
    identifying a person, object, or place from the sensor data;
    identifying an occurrence of an event from the sensor data based, at least in part, on whether the identified person, object, or place is included in a history of real-world experiences of a user of the mobile computing device;
    automatically initiating the mobile computing device to capture media data for adding to the history of real-world experiences of the user of the mobile computing device, in response to identifying the occurrence of the event from the sensor data;
    associating the media data captured by the mobile computing device with the event; and
    transmitting media capture event data identifying the event and the media data associated with the event to a server computer system for adding the media capture event data and the media data associated with the event to the history of real-world experiences of the user of the mobile computing device.

10. The non-transitory computer readable storage medium of claim 9, wherein the mobile computing device comprises a user wearable computing device including a head mounted display.

11. The non-transitory computer readable storage medium of claim 9, wherein the sensor data includes audio data, and identifying the person, object, or place from the sensor data comprises parsing the audio data to identify one or more key words from the audio data.

12. The non-transitory computer readable storage medium of claim 9, wherein the sensor data includes image data, and identifying the person, object, or place from the sensor data comprises performing a recognition process to identify the object from the image data.

13. The non-transitory computer readable storage medium of claim 9, wherein the sensor data comprises a media data stream, and initiating the mobile computing device to capture media data in response to identifying the event from the sensor data comprises storing a segment of the media data stream.

14. The non-transitory computer readable storage medium of claim 9, wherein the sensor data includes location data and the event comprises the sensor being proximate to a specific location.

15. The non-transitory computer readable storage medium of claim 9, the method further comprising:
    transmitting a query of the user of the mobile computing device to the server computer system for initiating a search of one or more events included in the history of real-world experiences of the user; and
    receiving results relevant to the query that include data indicative of the one or more events and media data associated with the one or more events included in the history of real-world experiences of the user.

16. The non-transitory computer readable storage medium of claim 9, wherein the media data includes one or more of digital image data and digital audio data.

17. A system comprising:
    a memory;
    a processor;
    a sensor; and
    a capture event module included in the memory and executed via the processor to:
        receive sensor data from the sensor;
        identify a person, object, or place from the sensor data;
        identify an event from the sensor data based, at least in part, on whether the identified person, object, or place is included in a history of real-world experiences of a user of the mobile computing device;
        initiate one or more media data files to be captured in response to identifying the event;
        associate the captured one or more media data files with the event; and
        transmit media capture event data identifying the event and the media data associated with the event to a server computer system for adding the media capture event data and the media data associated with the event to the history of real-world experiences of the user of the system.

18. The system of claim 17, further comprising
    a head mounted display; and
    a frame assembly for wearing on a head of the user and to include the sensor and the head mounted display.

19. The system of claim 17, wherein the sensor comprises a microphone to capture audio data, and identifying the person, object, or place from the sensor data comprises parsing the audio data to identify one or more key words from the audio data.

20. The sensor of claim 17, wherein the sensor comprises an image sensor to capture image data, and identifying the person, object, or place from the sensor data comprises performing a recognition process to identify the object from the image data.

21. The system of claim 17, wherein the sensor data comprises a media data stream, and the one or more media data files each comprise a segment of the media data stream.

22. The system of claim 17, wherein the sensor data comprises location data and the event comprises the sensor being proximate to a specific location.

23. The system of claim 17, further comprising a query module included in the memory and executed via the processor to
    transmit a query of the user of the system to the server computer system for initiating a search of one or more events included in the history of real-world experiences of the user; and
    receive results relevant to the query that include data indicative of the one or more events and media data associated with the one or more events included in the history of real-world experiences of the user.

24. The system of claim 17, wherein each of the one or more media data files includes one or more of digital image data and digital audio data.

* * * * *